Figure 1:
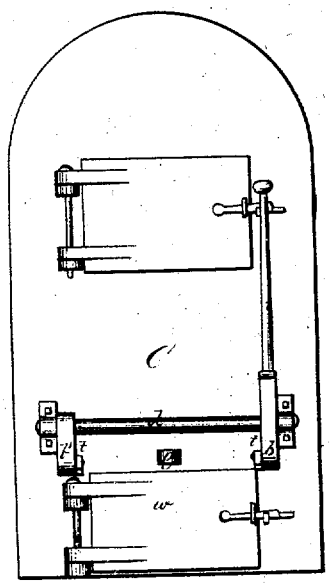

E. S. Renwick, 3. Sheets. Sheet. 1.

Furnace Grate.

No. 3,967. Reissued May 10. 1870.

Witnesses.
John Rathbone Jr.
W. L. Bennett.

Inventor
E. S. Renwick

N. PETERS, PHOTO-LITHOGRAPHER, WASHINGTON, D. C.

3. Sheets. Sheet. 2.

E. S. Renwick,

Furnace Grate.

No. 3967. Reissued May 10. 1870.

Witnesses
John Rathbone Jr.
W. L. Bennem

Inventor
E. S. Renwick

N. PETERS, PHOTO-LITHOGRAPHER, WASHINGTON, D. C.

3 Sheets. Sheet 3

E. S. Renwick,

Furnace Grate.

No. 3,967. Reissued May 10. 1870.

Witnesses
John Rathbone Jr.
W. L. Bennem

Inventor
E. S. Renwick

N. PETERS, PHOTO-LITHOGRAPHER, WASHINGTON, D. C.

United States Patent Office.

EDWARD SABINE RENWICK, OF MILLBURN, NEW JERSEY.

*Letters Patent No.* 81,109, *dated August* 18, 1868; *reissue No.* 3,967, *dated May* 10, 1870.

IMPROVEMENT IN GRATES FOR FURNACES.

The Schedule referred to in these Letters Patent and making part of the same

*To all whom it may concern:*

Be it known that I, EDWARD SABINE RENWICK, formerly of the city, county, and State of New York, now of Millburn, in the State of New Jersey, invented certain new and useful Improvements in Grates for Hot-Air Furnaces and for other furnaces to which said improvements may be applicable, and that the following is a full, clear, and exact description and specification of my invention.

Great difficulty has been experienced by housekeepers in having their furnace-grates cleared of ashes, the difficulty arising from the want of efficient means by which women-servants can do the work. A similar difficulty has been experienced in clearing the grates of the furnaces of steam-boilers of ashes and clinker, and for the want of efficient means for that purpose. The object of my invention is to provide such means; and It consists, first, of the combination of the following instrumentalities, viz: the fire-box of the furnace; two gangs of grate-bars, the members of which are arranged alternately in the grate, and one of which gangs is reciprocatable longitudinally relatively to those of the other; a rock-shaft or journals, with which the grate-bars are connected, so that they may be tipped or turned out of their horizontal positions, to discharge the contents of the fire-box; and a grate-bar mover, connected with the reciprocatable grate-bars, by a connection applied to them in the vicinity of the axis of said rock-shaft or journals, so that the members of one gang of grate-bars may be moved longitudinally without moving those of the other gang simultaneously in the same direction, and also that the grate-bar mover need not be disconnected, either from its supports or from the grate-bars when the grate is tipped or is restored to its place.

My invention consists, further, of the combination of the fire-box, two gangs of grate-bars, rock-shaft, and grate-bar mover, as above specified, with a lever-handle arranged at the exterior of the ash-pit, so that the furnace-contents may be readily discharged, and that the reciprocatable gang of grate-bars may be moved longitudinally, while the ash-pit is closed by a door, so as to prevent the escape of ashes.

My invention consists, further, of the combination of the fire-box with two gangs of grate-bars, the members of one of which are reciprocatable longitudinally relatively to the other, and also have their upper edges constructed with saw-teeth projections, gently inclined in one direction, and abrupt at their ends, so that, when the reciprocatable grate-bars are moved longitudinally in one direction, the abrupt ends of the saw-teeth will operate upon clinkers, and move them forward; and when the said bars are moved in the reverse direction, the gently-inclined edges of the teeth will pass beneath the clinkers without pushing them backward. Hence, when this portion of my invention is used, the clinkers may be moved forward progressively by the reciprocation of the grate-bars, and may be discharged at their ends.

My said improvements may be embodied in various forms, and in order that my invention may be understood, I have represented in the accompanying drawings several of the modes in which I have contemplated the application of the principle or characteristic by which my invention may be distinguished from others—

Figure 2:
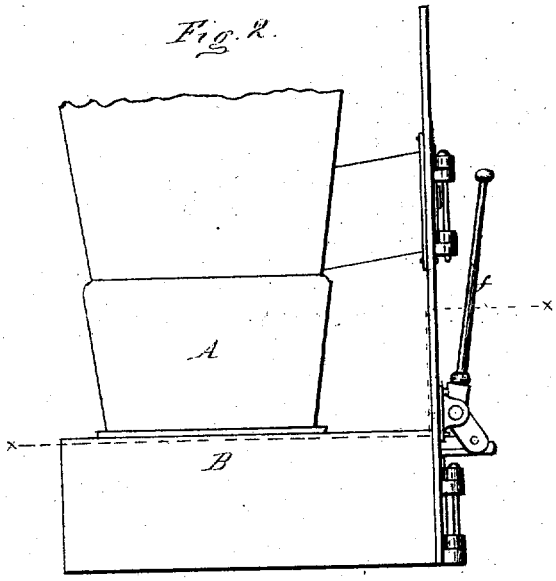
Figure 3:
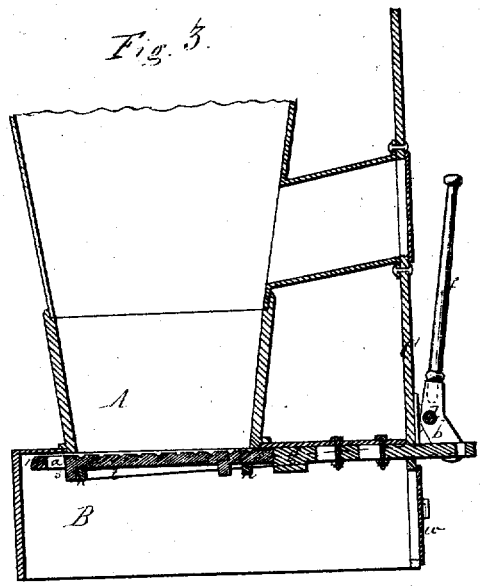

Figure 1 representing a front view of the front plate and appurtenances of a hot-air furnace embodying my improvements;

Figure 2 representing a side view of portions of said furnace;

Figure 3 representing a vertical section of the same; and

Figure 4:
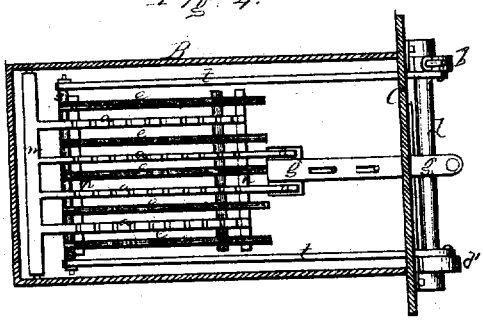

Figure 4 representing a plan of the furnace, with certain parts removed to permit the grate-bars and their appurtenances to be seen.

Figure 7:
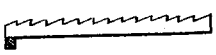
Figure 5:
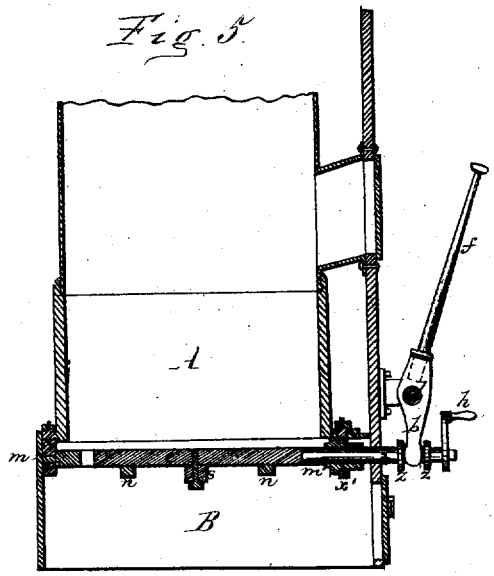
Figure 6:
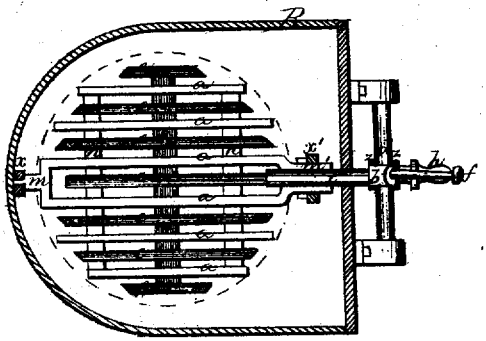

Figures 5 and 6 represent, respectively, a vertical section and plan of another hot-air furnace, with a different form of grate and appurtenances; and Figure 7 represents a grate-bar with one of the forms of the surface-projections which I employ.

The form of a fire-box, with which the remaining members of my combinations are combined, is not material to the invention.

In the furnace, parts of which are represented in figs. 1 to 4, the fire-box A is quadrangular, and it is supported, in the usual manner customary in hot-air furnaces, upon an iron ash-pit, B, having a hole in its top corresponding with the opening in the bottom of the fire-box. The grate-bars of this furnace are divided into two gangs, the members *a a a* of one of which are, for distinction, left white in figs. 3 and 4, while the members *e e e* of the other gang are lined.

The members *a a a* of one gang are all secured to a rock-shaft, *m*, which crosses the ash-pit, and has journals at its ends, which are fitted to turn in holes made in the opposite sides of the ash-pit, so that said sides form bearings for the rock-shaft to turn upon.

The members *e e e* of the other gang of grate-bars alternate with those of the first, and are reciprocatable longitudinally relatively to them, as they are arranged to slide longitudinally upon the cross-bars *n n*, secured to the first gang; and said cross-bars have slight depressions in them, corresponding with the reciprocatable bars, so as to guide the latter in their longitudinal movement.

All the reciprocatable bars in this example are connected with a cross-bar, *s*, whose ends project beyond the grate-bars, and are formed into journals, which are connected, by rods *t t*, with two arms, *b b'*, projecting downward from an operating shaft, *d*, that is supported in bearings secured to the front plate C of the furnace.

In passing to this operating shaft, the rods *t t* pass through holes made in the front plate C for the purpose.

The operating shaft *d* is provided with a lever-handle, *f*, which, for convenience, is fitted in a socket formed in one of the arms *b*.

In order that the grate may be held in its horizontal position, a sliding holder, *g*, is provided, to engage with the prolonged ends *o o* of two of the grate-bars; and, as the remaining grate-bars are connected with these two by the cross-bars *n n*, the whole grate is held from tipping or turning out of its horizontal position. The upper surfaces of the grate-bars are indented, so as to produce projections, as represented in fig. 3.

When the ashes are to be discharged from the fire-box of the furnace above described, the operating shaft *d*, with its arms *b b'*, which constitute the grate-bar mover, is rocked to and fro by applying the hand to the lever-handle *f*, and the gang of reciprocatable grate-bars *e e e* is thereby caused to reciprocate longitudinally, relatively to the members of the other gang *a a a*.

As the coals in the fire-box rest in part upon the reciprocatable grate-bars, and in part upon the residue, the coal will be acted upon by two forces, one of which tends to keep them from moving with the reciprocatable bars; and the practical result is, that the coals are caused to grind upon each other, and the ashes are effectually expelled. Moreover, as the lever-handle *f* is at the exterior of the ash-pit, and as the rods *t t* (which connect that handle with the reciprocatable gang of grate-bars within) extend through small holes, the ash-pit may be closed by a door, *w*, and the ashes and dust are practically retained in the ash-pit, and prevented from annoying the operator during the raking of the fire.

The projections on the upper surface of the grate-bars enable the latter to take a better hold of the coals, and facilitate the operation.

When the contents of the fire-box are to be discharged, the holder *g* is pulled forward, so as to disengage it from the grate-bars and permit the whole grate to tip or turn downward upon the rock-shaft *m* as an axis, and, as the connection of the rods *t t* with the reciprocatable grate-bars is applied to the latter close to the axial line of the rock-shaft *m*, the turning of the grate, either up or down, does not practically affect the connection with the operating shaft *d* and lever-handle *f*.

In the furnace, parts of which are represented in figs. 5 and 6, the fire-box A is circular, and the grate is arranged to turn upon one of its diametrical lines as an axis. In this example the gang of the reciprocatable grate-bars *e e e* is all connected by a central cross-bar, *s*, and the central grate-bar is extended to form the connection *t* with the grate-bar mover *b*, by which the whole gang is caused to move longitudinally.

The other gang of grate-bars, *a a a*, is connected together by cross-bars *n n*. This gang is fitted at its rear side with a journal, *m*, that is supported in a bearing, *x*, at the rear of the grate, and at the front side with a tubular journal, *m'*, that is supported in a bearing, *x'*, at the front side of the grate, so that the gang can be tipped or turned upon said journals; and as the gang of reciprocatable bars is connected with the other gang by the cross-bars *n s n*, the entire grate can be turned on the journals *m m'*, out of its horizontal position, for the purpose of discharging the contents of the fire-box.

In order that the reciprocatable bars of this form of grate may be moved longitudinally with ease, they are connected by the connection *t* with an arm, *b*, which forms the grate-bar mover, and projects downward from an operating shaft, *d*, at the front of the furnace, and a lever-handle, *f*, is provided for the purpose of rocking said shaft.

The arm *b* is forked, so as to embrace the connecting-bar or connection *t*, and the latter is fitted with collars, *z z*, which compel it to move to and fro with the arm *b*, and, at the same time, do not prevent it from turning on its axis.

In order that the grate may be readily tipped or turned, the end of the connection *t* is fitted with a crank-handle, *h*, and, as the said connection is connected with all the grate-bars, through the cross-bars *n s n*, the turning of it compels the whole grate to turn.

The lever-arm *f* may be arranged either directly over the connection *t* or at one end of the operating shaft *d*, at the side of the door of the furnace, as found expedient.

In both the above examples the arm or arms *b b'*, constituting the grate-bar mover, are connected with the reciprocatable gang of grate-bars by a connection (consisting of rods or a bar) which is applied to that gang in the vicinity of the rock-shaft or journals on which the grate is constructed to tip; hence, the grate-bar mover is not disconnected, either from its supports or from the grate when the latter is tipped to discharge the contents of the fire-box, and, consequently, neither time nor care is required to restore the grate-bar mover to its position when the grate is replaced in its horizontal position.

When the third part of my invention is to be used, I form the projections upon the upper surface of the grate-bars, as represented in fig. 7, or saw-toothed. The effect of this form of projection is to work the clinker progressively forward, so as to discharge it at the front ends of the grate-bars; and, in this case, an opening should be left between the front of the grate and the front side of the fire-box above it, for the escape of the clinkers.

In place of arranging the operating shaft *d* of the furnace, represented in figs. 1 to 4, to rock, it may be arranged to turn in its bearings, and it may be fitted, in place of arms, with eccentrics, the rings of which are connected with the rods *t t*, so that, by turning said shaft, the reciprocating longitudinal movement may be imparted to the grate-bars.

This construction is advantageous for steam-boilers, furnaces, or fire-boxes, as a rotary motion can, in such cases, be readily imparted to the shaft from the steam-engine.

In some cases I intend to make both gangs or grate-bars reciprocatable longitudinally at the same time, but in opposite directions, the effect of which upon the coals will be the same as making the members of one gang reciprocate longitudinally, and those of the other gang stationary; but in such cases the length of movement need be only half as much to produce the same effect.

Having thus described the several modes in which I have contemplated the application of the principle of my invention, I declare that I do not claim the several instrumentalities of which my combinations are composed, separately from the combinations; but

What I claim as my invention, and desire to secure by Letters Patent, is—

The combination of the following instrumentalities, viz: the fire-box, two gangs of grate-bars, the members of one of which are reciprocatable longitudinally relatively to those of the other; a rock-shaft with which the grate-bars are connected, so that they may be tipped; and a grate-bar mover, connected with one gang of grate-bars in the vicinity of the axis of the rock-shaft, all operating substantially as before set forth.

Also, the combination of the following instrumentalities, viz: the fire-box; two gange of grate-bars, having the relationship aforesaid; the rock-shaft, on which the grate may be tipped; the grate-bar mover, connected with one gang of grate-bars in the vicinity of the axis of the rock-shaft; and a lever-handle. arranged at the exterior of the ash-pit, substantially as before set forth.

Also, the combination of the following instrumentalities, viz: the fire-box and the two gangs of grate-bars, the members of one of which are reciprocatable longitudinally, relatively to those of the other, and are also constructed at their upper edges with saw-tooth projections, abrupt at their ends, and gently inclined from their abrupt ends, substantially as before set forth.

In testimony whereof I have hereto set my hand this 2d day of March, A. D. 1870.

E. S. RENWICK.

Witnesses:
W. L. BENNEM,
JOHN RATHBONE, Jr.